United States Patent
Palmaer

[15] 3,641,831
[45] Feb. 15, 1972

[54] LINK CONFIGURATION FOR DRIVE CHAIN

[72] Inventor: Karl V. Palmaer, 5643 Fair Oaks Boulevard, Carmichael, Calif. 95608

[22] Filed: Mar. 16, 1970

[21] Appl. No.: 19,985

[52] U.S. Cl. ......................................................74/250 C
[51] Int. Cl. .....................................................F16g 13/02
[58] Field of Search..................74/250 R, 250 C, 249, 245

[56] References Cited

UNITED STATES PATENTS

| 3,066,549 | 12/1962 | Benjamin | 74/249 X |
| 310,997 | 1/1885 | Heald | 74/250 R X |
| 2,687,651 | 8/1954 | Webb | 74/250 R |
| 2,695,095 | 11/1954 | Anderson | 74/250 C UX |
| 2,869,380 | 11/1959 | Lemmon | 74/245 |
| 3,365,970 | 1/1968 | Steorts, Jr. | 74/249 |

FOREIGN PATENTS OR APPLICATIONS 702,893 2/1965 Canada

*Primary Examiner*—Leonard H. Gerin
*Attorney*—Mellin, Moore & Weissenberger

[57] ABSTRACT

A configuration for the links of a drive chain is disclosed in which the link is a unitary body having projections formed thereon for connecting the links together by means of pintles passing through apertures therein to form a chain. The link body has a central recess formed therein for engagement with the teeth of a sprocket wheel. Various embodiments are described, in all of which the link body is provided with a cylindrical driving surface having its axis coincident with the axis of one of the apertures therein through which a pintle is passed to connect the link into the chain. Methods for and advantages of fabricating the link configuration in plastic are disclosed.

14 Claims, 12 Drawing Figures

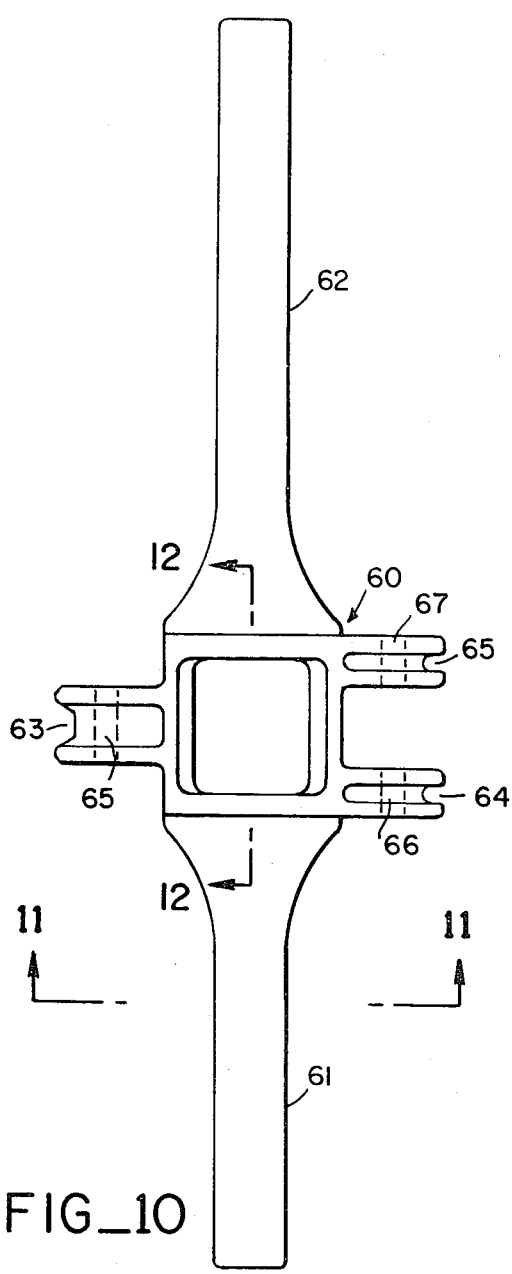
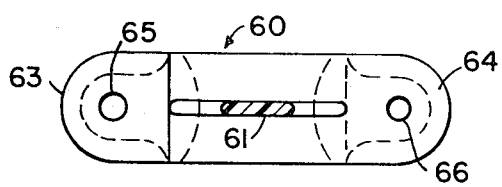
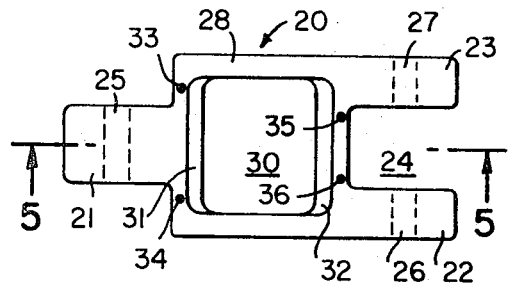
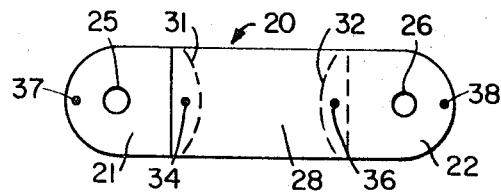
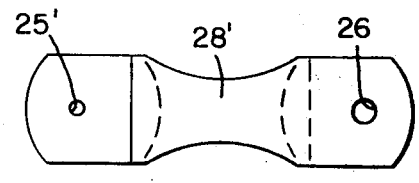
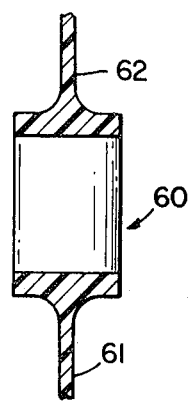
INVENTOR.
KARL V. PALMAER

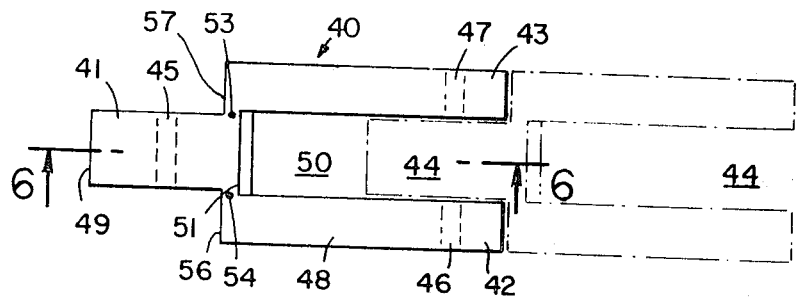
FIG_3
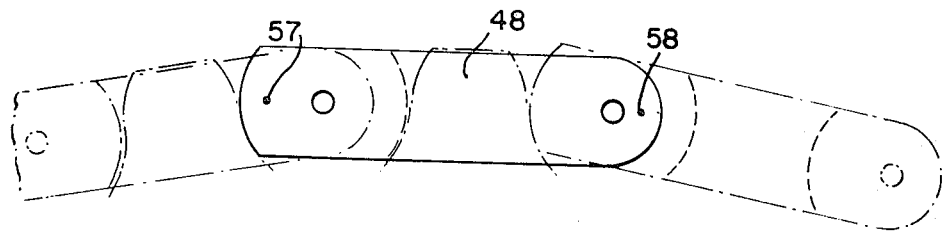
FIG_4
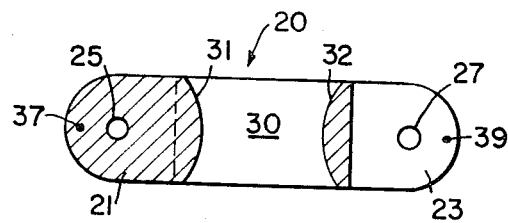
FIG_5
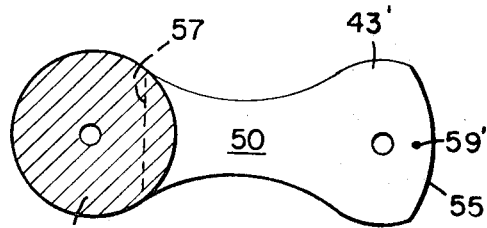
FIG_8
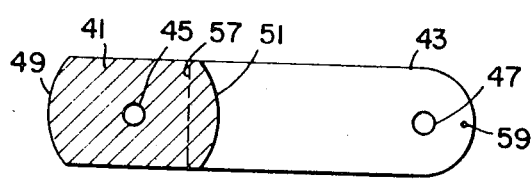
FIG_6
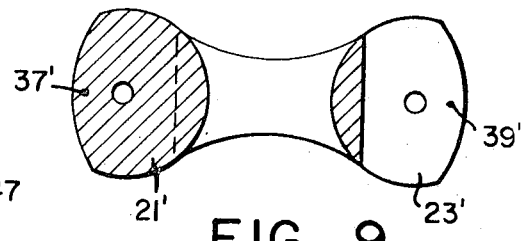
FIG_9
INVENTOR.
KARL V. PALMAER
BY
Mellin, Moore + Weissenberger
ATTORNEYS 3,641,831

LINK CONFIGURATION FOR DRIVE CHAIN

BACKGROUND OF THE INVENTION

This invention relates to drive chains for power transmission and more particularly to a link configuration for use in such chains which may be molded as a unitary body.

Drive chains for power transmission have conventionally comprised a plurality of links joined together by cross pins or pintles so that they may pivot with respect to each other. Each link is conventionally made of a plurality of parts including side members and cross members arranged to define an opening for receiving the teeth of a driving or driven sprocket wheel. The cross members may be nothing more than the pintles, but cylindrical rollers are usually mounted between the side members about the pintles to protect the pintles from wear and reduce the frictional resistance to the insertion and withdrawal of the sprocket teeth.

It has been most common to make links for drive chain of metal because of the strength and wear resistance of metal. However, metal is relatively heavy and many new plastic materials have been developed which have greater strength for a given weight than most metals and in addition are less expensive and more wear resistant than metal due to their lower coefficient of friction. In fact there are many applications in the chemical industry in which metal chains cannot be used because of the corrosive effects of the materials to be handled thereby. There are other applications where the metal would have a deleterious effect on the materials to be handled, such as in the food industry, and in any application most metals are subject to oxidation (i.e., rust) due to normal atmospheric and environmental conditions.

It is an object of this invention to provide a link configuration for a drive chain which may be molded as a unitary body, a plurality of such links being joined by simple pintles to form a chain.

It is a further object of this invention to provide a unitary body drive chain link configuration providing improved wear resistance reduced coefficient of friction.

It is another object of this invention to provide a drive chain link configuration in which the shear and tension stresses are balanced throughout the link body.

It is a still further object of this invention to provide a lightweight drive chain of high strength and corrosion resistance.

It is yet another object of this invention to provide a unitary body, plastic link for a drive chain having a configuration exhibiting improved wear resistance, a low friction coefficient, and balanced stresses.

It is yet a further object of this invention to provide a link configuration for drive chain which may be inexpensively and economically fabricated from plastics of high strength, low weight and having a low coefficient of friction by injection molding or transfer molding techniques, for example.

SUMMARY OF THE INVENTION

Briefly a link for a drive chain in accordance with this invention comprises a molded unitary body having a first projection formed on one side thereof and a pair of projections formed on the opposite side thereof which are spaced from each other to receive a projection identical to the first projection but on another link. The projections have generally cylindrical apertures therethrough, with the apertures through the spaced pair of projections having common axis parallel to the axis of the aperture through the first projection and adapted to be aligned therewith if such first projection were received between such pair of projections. A recess is formed in the body extending transversely to the axes of the apertures and the body is provided with a cylindrical driving surface having its axis coincident with one of the axes of the apertures through the projections.

BRIEF DESCRIPTION OF THE DRAWINGS

FIG. 1 is a plan view of a link in accordance with one embodiment of this invention;

FIG. 2 is a side view of the link shown in FIG. 1;

FIG. 3 is a plane view of a link in accordance with another embodiment of this invention with a second link according to such embodiment shown in phantom as connected to such link to form a chain;

FIG. 4 is a side view of a chain of links as shown in FIG. 3 with a sprocket, shown in phantom, in engagement therewith;

FIG. 5 is a cross-sectioned view taken along lines 5—5 of FIG. 1;

FIG. 6 is a cross-sectional view taken along lines 6—6 of FIG. 3;

FIG. 7 is a side view in elevation of a modification of the link shown in FIG. 2;

FIG. 8 is a cross-sectional view of a modification of the link shown in FIG. 6;

FIG. 9 is a cross-sectional view of a modification of the link shown in FIG. 5;

FIG. 10 is a plan view of a link in accordance with a further embodiment of this invention;

FIG. 11 is a cross-sectional view taken along lines 10—10 of FIG. 9; and

FIG. 12 is a cross-sectional view taken along lines 11—11 of FIG. 9.

DESCRIPTION OF THE PREFERRED EMBODIMENTS

Referring to FIG. 1, a link in accordance with one embodiment of this invention is shown in plan view. Such link comprises a unitary solid body 20 having a projection 21 formed on one side thereof and a pair of spaced projections 22 and 23 formed on the opposite side thereof. A generally cylindrical aperture 25 extends through the first projection 21 and generally cylindrical apertures 26 and 27 having a common axis parallel to the axis of the aperture 25 extend through the second projection 22 and third projection 23 respectively. The spacing 24 between the pair of projections 22 and 23 and their lengths are such that a projection identical to the projection 21 but on a further link may be received therebetween with the apertures 25, 26 and 27 in coaxial alignment. Thus a plurality of links as shown in FIG. 1 may be connected together to form a chain by placing the projection 21 on one of such links between the pair of projections 22 and 23 on another link and inserting a cylindrical pin or pintle in the aligned apertures 25, 26 and 27 thereof.

The main portion 28 of the body 20 is provided with a recess 30 engagement with the teeth of a sprocket wheel. The recess 30 is preferably formed in the main portion 28 of the body 20 such that its center is equally spaced from the axis of the aperture 25 and from the common axis of the apertures 26 and 27. In addition, the configuration of the recess 30 may be such as to provide a cylindrical driving surface 31, for example, having its axis coincident with the axis of one of the apertures 25, for example. The purpose of such cylindrical driving surface 31 according to this invention is to reduce the wear resulting from engagement with the teeth of a sprocket wheel as well as to reduce resistance to the insertion and removal of such teeth from the recess 30. It will be understood that such driving surface must exhibit a low coefficient of friction. The required low coefficient of friction is preferably provided by making the link body of an appropriate plastic material. However, auxiliary lubricants may be used where the material of the link body does not inherently have a sufficiently low coefficient of friction.

As shown in FIGS. 1 and 2, the recess 30 passes completely through the main portion 28 of the body 20 in a direction normal to the axes of the apertures 25, 26 and 27. However, it will be understood that it is not necessary for the recess 30 to pass completely through the body 20. It is only necessary that the recess 30 extend into the body for a sufficient distance in a direction normal to the axes of the apertures 25, 26 and 27 to provide for efficient engagement with the teeth of a sprocket wheel. It will also be seen that the recess 30, according to this embodiment of the invention, provides a second cylindrical driving surface 32 having its axis coincident with the common axis of apertures 26 and 27. Thus the link shown in FIGS. 1 and 2 is adapted to drive or be driven in either direction by engagement with the teeth of a sprocket wheel. It will be understood that one of the cylindrical driving surfaces 31 and 32 may be omitted in links for a chain which is to drive or be driven in one direction only. Furthermore, the cylindrical driving surface in the recess 30 may be provided by a member which does not form a unitary part of the body 20 in which the recess 30 is formed. Such an embodiment of this invention is shown in FIGS. 3, 4 and 6.

Referring to FIG. 3, a link according to this invention comprising a solid unitary body 40 having a recess 50 formed therein which joins the space 44 between the pair of projections 42 and 43 formed on one side thereof such that the recess 50 and the space 44 constitute extensions of each other is shown. As best shown in FIG. 6, the projection 41 formed on the opposite side of the body 40 from the pair of projections 42 and 43 is provided with a cylindrical surface 49 on the free end thereof, which cylindrical surface 49 has its axis coincident with the axis of the aperture 45 passing through such projection 41. As shown in FIG. 3, the length of the projection 41 is such that its free end forms a boundary of the recess 50 when it is inserted between the pair of projections 42 and 43 of another link body 40. Thus the end of projection 41 provides a cylindrical surface 49 in the recess 50 which functions as a driving surface having its axis coincident with the common axis of apertures 46 and 47 passing through projections 42 and 43, respectively.

As shown in FIG. 3, the recess 50 in the link body 40 may also be provided with a cylindrical driving surface 51, having its axis coincident with the axis of the aperture 45 passing through the first projection 41. Thus the link 40 shown in FIG. 3 is also adapted for use in a reversible chain, that is, a chain which may drive or be driven either from left to right or from right to left by engagement with the teeth of a sprocket wheel as shown in FIG. 4.

Referring again to FIGS. 1, 2 and 5, it will be seen that an advantage of this embodiment of the invention is that the shear stresses throughout the link body 20 may be balanced. In other words, the dimensions of the link body 20 may be selected so that all portions thereof which are subjected to shear stresses when the link body 20 is included in a chain under loaded conditions are capable of withstanding the same amount of shear stress. This is an extremely important consideration in designing a drive chain of minimum weight for use in a given application. It will be understood that if any portion of the link body 20 is capable of withstanding greater shear stress than another portion of the body 20 under loaded conditions it simply means that that portion is heavier than it needs to be, thereby adding weight to the chain without beneficial result.

Thus, in FIG. 1 the points at which stress will occur are indicated generally be references numerals 33, 34, 35 and 36 at the bases or roots of the projections 21, 22 and 23 where they join the main portion 28 of the body 20. In addition, as shown in FIGS. 2 and 5, shear stresses tend to occur in the areas indicated generally by reference numerals 37, 38 and 39 between the apertures 25, 26 and 27, and the ends of the projections 21, 22 and 23, respectively. As shown in FIGS. 1, 2 and 5, the mass of the link body 20 at these points 33, 34, 35, 36, 37, 38 and 39 may be adjusted with respect to each other so that the shear stress appearing therein is substantially balanced at all points. Thus it will be seen in FIG. 1 that the width of the projection 21 is substantially twice the width of projections 22 and 23. Similarly, as shown in FIGS. 2 and 5, the radius of curvature at the ends of the projections 21, 22 and 23 from the center of the apertures 25, 26 and 27, is such that the mass of material subjected to shear stresses at points 37, 38 and 39 is substantially equal to the mass of material subjected to shear stresses at points 33, 34, 35 and 36. The diameter and material of the pintles is, of course, also selected so that the shear stresses induced therein are equal to the shear stresses at such points.

It will be noted from FIG. 1 that the thickness of the walls of the main portion 28 of the body 20 is substantially less than the thickness of the projections 21, 22 and 23. This is due to the fact that such walls are required only to withstand tensile stresses. Since most materials which would be useful in fabricating links for a drive chain are much stronger in tension than they are in shear, the mass of material required in such walls is less. In fact, it may be desirable to further reduce the mass of such walls as indicated in FIG. 7. This design feature is perhaps well known in the chain art; however, in accordance with the teaching of this invention care must be taken to preserve the balance of the shear stresses at points 33, 34, 35 and 36 as indicated.

Referring to FIGS. 3, 4 and 6, it will be seen that a balance of shear stresses at points 53, 54, 57, 58 and 59 will be more difficult to attain. As shown in FIGS. 3, 4 and 6, such shear stresses are not balanced. Instead, the shear stresses that can be tolerated at points 53 and 54 will tend to be substantially less than the shear stresses that can be tolerated at points 57, 58 and 59. An attempt to balance such shear stresses by increasing the mass of material present at points 53 and 54 will necessarily require that the spacing of the center of the recess 50 from the axis of the aperture 45 be different than the spacing thereof from the common axis of the apertures 46 and 47. If the center of the recess 50 is offset in this manner, it will be seen that the link will pivot about a different radius at one end than at the other as it passes across a sprocket wheel. Thus the chain cannot lie smoothly against the sprocket wheel; instead each link thereof will tend to be raised at one end leaving a portion of the link unsupported and resulting in the application of unpredictable shear stresses throughout the body of the link under loaded condition.

FIG. 8 shows another approach to the equalization of shear stresses in a link according to the embodiment shown in FIGS. 3 and 6. According to the embodiment shown in FIG. 8, the projections 41, 42 and 43 are short cylinders having radii equal to the radius of curvature of the driving surface. Thus, the center of the recess 50' is not offset; however it will be seen that the pair of projections 42' and 43' cannot be perfect cylinders but must be flattened at their free ends, as indicated at 55, in order to allow for the shoulders 56 and 57 on opposite sides of the projection 41' so that the links may be connected together and pivot with respect to each other. Thus, unbalanced shear stress will necessarily result at point 59'.

FIG. 9 shows a similar modification of the embodiment of this invention shown in FIGS. 1 and 5. By comparison of the modification shown in FIG. 9 with that shown in FIGS. 1 and 5, it will be seen that the shear stress which can be tolerated at points 37', 38' (not shown in FIG. 9) and 39' may be balanced with the shear stress which can be tolerated at points in such modification corresponding to points 33, 34, 35 and 36 in FIG. 1 in spite of the required flattening or foreshortening of the projection 21', 22', and 23'.

For the above reasons it will be understood that the embodiment of this invention shown in FIGS. 1, 2 and 5, as well as the modification thereof shown in FIGS. 7 and 9, are preferred since the shear stresses therein may be balanced as described hereinabove.

According to a further embodiment of this invention, as indicated in FIG. 7, the aperture 25' through the first projection 21 may be made smaller than the apertures 26 and 27 through the pair of projections 22 and 23. According to this modification, the pin or pintle used to fasten the links 20 together to form a chain would be dimensioned to be press-fit into the smaller aperture 25 and would thus fit loosely into apertures 26 and 27. The purpose of this modification is to allow a chain made of such links to accommodate a certain amount of lateral displacement. Thus, each link 20 may be deflected laterally of the line of travel of the chain from the next adjacent link without imposing undue stress on the pintle connecting the two links. It will be understood that the same result may be achieved by making the apertures 26 and 27 smaller than the aperture 25 and using a pintle dimensioned to be press-fit into such smaller apertures 26 and 27 to interconnect the links. In either case, a chain formed of such links will be capable of accommodating a substantial amount of lateral deflection when the incremental deflection which may be accommodated between each pair of links is totaled over a number of links.

Although links in accordance with the teaching of this invention as well as the pintles used to connect the links together to form a chain may be made of any material, it is preferred to form both the link bodies 20 and 40 and such pintles of plastic. Plastic is preferred for a number of reasons. In the first place, plastics are known which have greater strength for a given weight than any other material suitable for use in a drive chain. Furthermore, plastic materials having very low coefficients of friction are known and suitable for use in forming such link bodies. As pointed out hereinabove, plastic materials tend to be more resistant to corrosion than most metals and finally plastic materials are inherently suited to inexpensive and economical methods of fabrication such as injection molding and transfer molding. It will be seen that link bodies 20 and 40 in accordance with the teaching of this invention may be readily manufactured in quantity by injection molding and transfer molding techniques which are well known in the plastics art. Thus a drive chain of plastic link bodies in accordance with the teaching of this invention may be fabricated at far less cost of plastic than of metal for a given strength and total mass while at the same time exhibiting improved corrosion resistance. In addition, a longer life may be expected due to the low coefficient of friction of plastic materials as compared to metals, which low coefficient of friction also avoids the need for auxiliary lubrication of a plastic chain in operation.

Referring to FIG. 10, a further modification of the embodiment of this invention shown in FIG. 1 is depicted. According to this embodiment of the invention, the link body 60 includes a pair of wing members 61 and 62 which are formed integrally with the link body as shown in FIG. 12. Such wing members 61 and 62 enable the chain to be attached to or embedded in a belt member, for example; whereby power may be transmitted from the drive chain formed of such links to the belt. It will be understood that wing members 61 and 62 are merely examples of members which might be formed integrally with a link body in accordance with this invention in order to transmit power from a chain formed of such links to other bodies or devices.

A further feature shown in FIGS. 10 and 11 are the depressions 63, 64 and 65 formed in the projections of the link body 60. Such depressions are necessary where injection molding techniques are used to form the link body in order to enable close dimensional control of the apertures 65, 66 and 67 through such projections. It has been found that if the depressions 63, 64 and 65 are not designed into the link body, then the apertures 65, 66 and 67 will tend to distort in the central portion thereof when the body is removed from the mold. This would be particularly undesirable where the diameter of the aperture 65, for example, is made larger than the diameter of the apertures 66 and 67 in order to provide for lateral displacement of the links from each other as described hereinabove.

Thus it will be seen that many modifications can be made in the configuration of the links of use in fabricating a drive chain in accordance with the teaching of this invention in order to enable the chain to be adapted for many varied applications. It is contemplated that those skilled in the art will make various combinations of the modifications described hereinabove, as well as others, in order to adapt the link configuration of this invention for use in drive chains for various applications. Thus the basic features of the configuration for which protection is sought herein are set forth in the following claims.

What is claimed is:

1. A link for use in fabricating a drive chain for power transmission, said link comprising a unitary generally rectangular body having:

a. a first projection formed on one side thereof, said projection having a generally cylindrical aperture therethrough with its axis extending transversely of said projection;
   b. second and third projections formed therein on the opposite side thereof from said first projection and spaced from each other to receive a projection identical to said first projection, said second and third projections having generally cylindrical apertures therethrough with a common axis extending transversely of said projections parallel to and adapted to be aligned with said axis of said aperture through said first projection if said first projection were received between said second and third projections;
   c. an aperture formed therethrough extending transversely to said axes of said generally cylindrical apertures; and
   d. a cylindrical driving surface formed thereon for engagement with a sprocket tooth, said driving surface having its axis coincident with said axis of said aperture through said first projection.

2. A link as claimed in claim 1 wherein said aperture and the space between said second and third projections join and form extensions of each other.

3. A link as claimed in claim 2 wherein said first projection has said cylindrical driving surface formed on the free end thereof.

4. A link as claimed in claim 3 wherein said recess forms a second cylindrical driving surface having its axis coincident with the common axis of said apertures through said second and third projections.

5. A link as claimed in claim 1 wherein said cylindrical driving surface is formed by said recess.

6. A link as claimed in claim 1 wherein said recess forms a first cylindrical driving surface having its axis coincident with the axis of the aperture through said first projection and a second cylindrical driving surface having its axis coincident with the common axis of said apertures through said second and third projections.

7. A link as claimed in claim 6 comprising a main body portion which is substantially rectangular in plan view and substantially rectangular in side view, said first projection comprising a generally rectangular extension of said main body portion in side view and a generally rectangular digit centered on one side thereof in plan view, and said second and third projections comprising generally rectangular extensions of said main body portion in side view and generally rectangular digits equally spaced from the center of the opposite side thereof in plan view.

8. A link as claimed in claim 7 wherein said recess is a substantially rectangular aperture extending through said main body portion in plan view.

9. A link as claimed in claim 8 wherein the dimensions of said body portion, said projections and said recess are selected to provide that all shear stresses occurring in said body when included in a chain under loaded conditions are substantially equal.

10. A link as claimed in claim 9 wherein the height and thickness dimensions of said main body portion in side view are reduced to provide tensile stress therein substantially equal to said shear stresses when included in a chain under loaded conditions, whereby the weight of said link is reduced toward the minimum value for a given load.

11. A link as claimed in claim 1 wherein said generally cylindrical aperture through said first projection has a diameter different from the diameter of said apertures through said second and third projections.

12. A link as claimed in claim 11 wherein said diameter of said aperture through said first projection is smaller than said diameter of said second and third projections.

13. A link as claimed in claim 1 wherein said body has a fourth projection formed thereon extending in a direction transverse to the direction in which said first, second and third projections extend.

14. A link as claimed in claim 1 wherein the center of said body has its locus in said plane with said axes of said apertures.

UNITED STATES PATENT OFFICE
CERTIFICATE OF CORRECTION

Patent No. 3,641,831                  Dated February 15, 1972

Inventor(s) KARL V. PALMAER

It is certified that error appears in the above-identified patent and that said Letters Patent are hereby corrected as shown below:

Column 1, line 65, "a recess" should read --an opening--;
Column 2, lines 44-45, "a recess" should read --an opening--;
Column 2, lines 46, 49, 56, 63, 66, 68, and 71, "recess" should read --opening--;
Column 3, line 11, "a recess" should read --an opening--;
Column 3, lines 6, 8, 21, 24, and 28, "recess" should read --opening--;
Column 4, lines 22, 25, and 38, "recess" should read --opening--.
Column 6, lines 13 and 19, "aperture" should read --opening--;
Column 6, lines 25, 30, 31, 47, and 51, "recess" should read --opening--.

Signed and sealed this 2nd day of January 1973.

(SEAL)
Attest:

EDWARD M. FLETCHER, JR.                  ROBERT GOTTSCHALK
Attesting Officer                          Commissioner of Patents